SENSOR FOR A SPACE DISCHARGE COMMUTATOR DYNAMOELECTRIC MACHINE
Filed June 9, 1964 2 Sheets-Sheet 1
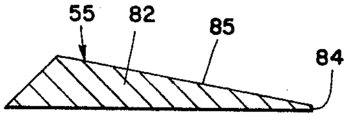
FIG. 4
FIG. 1
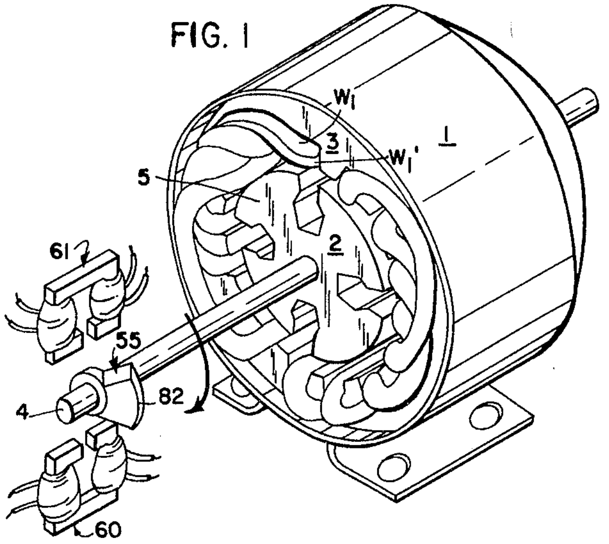
FIG. 3
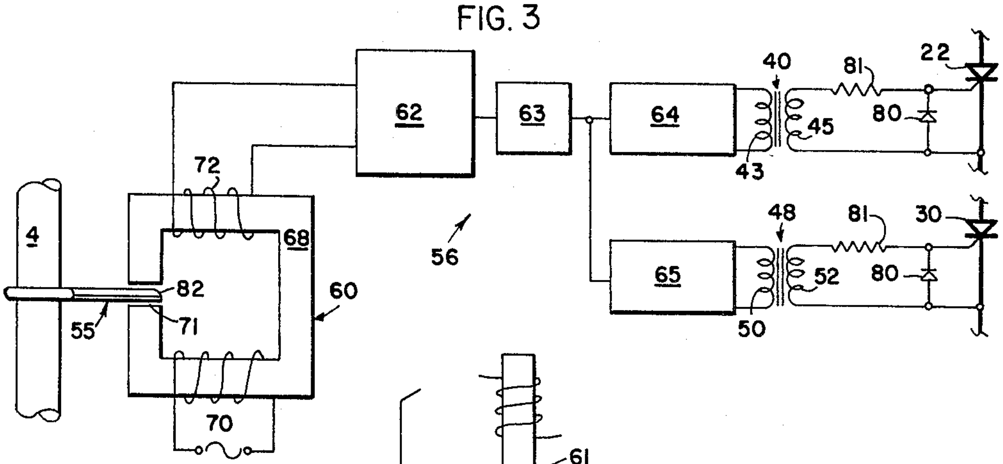
FIG. 5
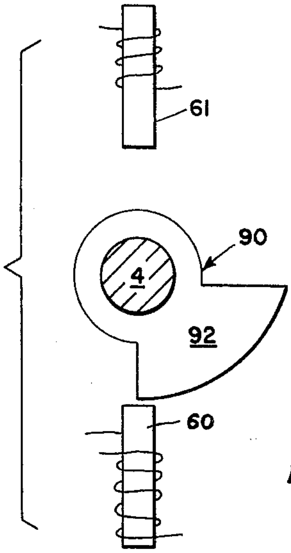
INVENTORS.
ARNOLD A. BECK.
VIRGIL I. JOHANNES.
BY
Frederick E. McMullen
ATTORNEY.

SENSOR FOR A SPACE DISCHARGE COMMUTATOR DYNAMOELECTRIC MACHINE

Filed June 9, 1964

INVENTORS.
ARNOLD A. BECK.
VIRGIL I. JOHANNES.
BY
Frederick E. McMullen
ATTORNEY.

United States Patent Office 3,280,396
Patented Oct. 18, 1966

3,280,396

SENSOR FOR A SPACE DISCHARGE COMMUTATOR DYNAMOELECTRIC MACHINE

Arnold A. Beck, Syracuse, N.Y., and Virgil I. Johannes, Plainfield, N.J., assignors to Carrier Corporation, Syracuse, N.Y., a corporation of Delaware Filed June 9, 1964, Ser. No. 373,653
3 Claims. (Cl. 318—138)

This invention relates to dynamoelectric machines, and more particularly to a motor intended for operation on direct current.

Conventional dynamoelectric machines, such as direct current motors, normally employ a contacting brush and commutator mechanism to selectively energize and deenergize the motor windings to accommodate movement of the motor rotor relative to the stator. Where the aforementioned brush and commutator mechanism is replaced by an electronic type commutating or operating mechanism, energization and deenergization of the motor windings in accordance with movement of the motor rotor relative to the motor stator necessitates that the electronic type operating mechanism include a means for sensing movement of the motor rotor relative to the stator.

It is a principal object of the present invention to provide a new and improved device for sensing movement between the relatively movable parts of a dynamoelectric machine.

It is a further object of the present invention to provide an improved position sensor usable to signal movement of one structure relative to another in proportion to the degree of movement between the structures.

It is a further object of the present invention to provide an improved control signal generating means for use with electronic type motor operating mechanisms.

It is an object of the present invention to provide a new and improved sensor adapted to be rotated in unison with the rotor of a motor for producing in cooperation with signal output means a control signal reflecting movement of the motor rotor. Other objects will be apparent from the ensuing description.

The invention relates to a motor comprising in combination at least one energizing winding, a rotor movable in response to energization of the winding, control means responsive to a first signal to energize the winding, the control means deenergizing the winding in response to a second signal, signal generating means including at least one transformer having a secondary winding operably related to the control means, and means responsive to movement of the motor rotor for regulating the output signal of the signal generating means including a component movable in accordance with the motor rotor having a radially extended part of predetermined arcuate length movable into transformer relationship with the signal generating means transformer, the component part having a nonuniform magnetic mass so that movement of a first portion of the component part into transformer relationship with the signal generating means transformer establishes a first signal in the output winding of the transformer, movement of a second portion of the component part into transformer relationship with the signal generating means transformer establishing a second signal in the output winding of the transformer.

The attached drawings illustrate a preferred embodiment of the invention in which:

FIGURE 1 is a view of a motor employing applicants' novel operating arrangement;

FIGURE 3 is a block diagram of the control means for the operating arrangement shown in FIGURE 2;

FIGURE 4 is an enlarged cross sectional view of the position sensor taken along lines IV—IV of FIGURE 2; and FIGURE 5 is a plan view illustrating an alternate position sensor construction for use with the operating arrangement shown in FIGURE 2 of the drawings.

Figure 2:
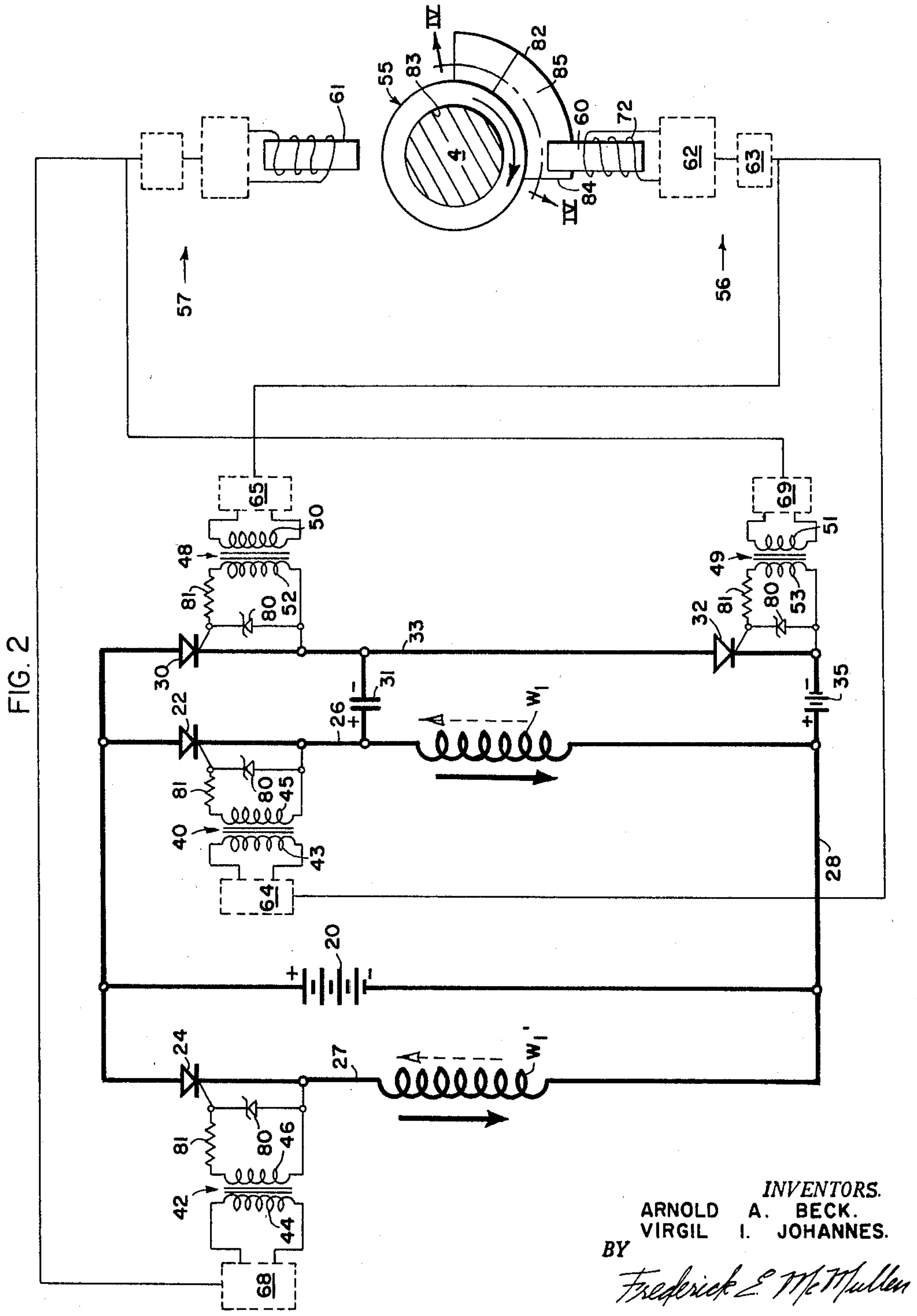
FIGURE 2 is a circuit diagram showing the operating arrangement according to this invention.

Referring to FIGURE 1 of the drawings, there is shown a motor 1 having a relatively rotatable rotor 2 and stator 3 inductively connected one to the other. Preferably, rotor 2 comprises a permanently magnetized member 5 having north-south poles with output shaft 4. Stator 3 is provided with one or more pairs of windings $W_1$,$W_1'$; $W_n$, $W_n'$ suitably wound thereon so that each of the windings $W_1$, $W_n$ is inductively coupled with winding $W_1'$, $W_n'$ respectively as by positioning the turns of windings $W_1$, $W_n$ in the same slot as the turns of windings $W_1'$, $W_n'$ respectively. Various stator winding arrangements such as wave may be contemplated.

Windings $W_1$, $W_1'$; $W_n$, $W_n'$, upon flow of current therethrough, establish north-south magnetic poles. It is understood that a reversal in the direction of current flow through windings $W_1$, $W_1'$; $W_n$, $W_n'$ renders the magnetic poles south-north.

Referring to FIGURE 2 of the drawings, applicants' operating arrangement for energizing windings $W_1$, $W_1'$ of motor 1 to effect rotation of rotor 2 is therein shown. It is understood that energization of remaining pairs of motor windings $W_n$, $W_n'$ is similarly controlled.

A suitable source of primary direct current energy, for example, battery 20, is provided. Suitable switching devices 22, 24 are series connected with windings $W_1$, $W_1'$ respectively across the positive and negative sides of battery 20. Series connected switching devices 30, 32 are connected in parallel with switching device 22 and its associated winding $W_1$ across the positive and negative sides of battery 20. Switching devices 30, 32 may in the alternative be connected in parallel with switching devices 24 and winding $W_1'$. Switching devices 22, 24, 30, 32 are preferably solid state or semiconductor type switching devices and preferably silicon-controlled rectifiers. Other suitable semiconductor switching devices such as transistors may be contemplated.

The input electrodes of silicon-controlled rectifiers 22, 24 are connected to the positive terminal of battery 20 and output electrodes thereof are connected to windings $W_1$, $W_1'$ by lines 26, 27 respectively. Windings $W_1$, $W_1'$ are connected to the negative terminal of battery 20 by means of a common return or ground line 28.

Silicon-controlled rectifier 22, when rendered operative, completes a circuit from the positive terminal of battery 20 through winding $W_1$ and ground line 28 to the negative terminal of battery 20. Similarly, silicon-controlled rectifier 24, when rendered operative, completes a circuit from the positive terminal of battery 20 through winding $W_1'$ and line 28 to the negative terminal of battery 20. Current flow in windings $W_1$, $W_1'$ is in the direction shown by the solid line arrows.

The input electrode of silicon-controlled rectifier 30 is connected to the positive terminal of battery 20 while the output electrode thereof is connected by line 33 to the input electrode of silicon-controlled rectifier 32. A line 34 connects the output electrode of silicon-controlled rectifier 32 to the negative side of a suitable source of secondary direct current energy, for example, control battry 35. A suitable capacitor 31 is connected between line 26 and line 33.

Control transformers 40, 42 having secondary windings 45, 46 respectively connected across the control electrode and output electrode of silicon-controlled rectifiers 22, 24 respectively are provided. Primary windings 43, 44 of transformers 40, 42 are connected to trigger circuits 64, 68 of pickup devices 56, 57 respectively.

Control transformers 48, 49 having secondary windings 52, 53 respectively connected across the control electrode and output electrode of silicon-controlled rectifiers 30, 32 respectively are provided. Primary windings 50, 51 of control transformers 48, 49 are connected to trigger circuits 65, 69 of pickup devices 56, 57 respectively.

A sensor 55 adapted to be secured to motor shaft 4 for rotation therewith is provided. Sensor 55 comprises a generally cylindrical element having extending part 82 of predetermined arcuate extent and uniform radial dimension. Sensor 55 includes an opening 83 for receiving the motor shaft 4. Suitable fastening means (not shown) are provided for fixedly attaching sensor 55 to motor shaft 4. Referring to FIGURE 4 of the drawings, part 82 of sensor 55 is generally triangular in cross section. The inclined or sloping forward surface 85 thereof terminates in leading edge 84.

Sensor 55 is positioned relative to variable coupling transformers 60, 61 of pickup devices 56, 57 so that part 82 of sensor 55 passes through the air gap of transformer 60, 61 during each revolution of motor shaft 4. It is understood that the duration during which part 82 of sensor 55 is within the transformer air gap may be controlled by varying the arcuate extent of sensor part 82. Additionally, the rate in which the size of the air gap of transformers 60, 61 is varied by sensor 55 is dependent upon the speed at which shaft 4 rotates and the slope of the forward surface 85 of sensor part 82.

Referring to FIGURE 3 of the drawings, pickup device 56 comprises variable coupling transformer 60, amplifier 62, detector 63 and trigger circuits 64, 65 connected to primary windings 43, 50 of control transformers 40, 48 respectively. Pickup device 57 is similarly constructed, trigger circuits 68, 69 thereof being connected to primary windings 44, 51 of control transformers 42, 49 respectively. Transformers 60, 61 of pickup devices 56, 57 are disposed in predetermined angular relation relative to one another about the circumference of motor shaft 4.

Variable coupling transformer 60 of pickup device 56 comprises a generally C-shaped core 68 formed from a suitable ferromagnetic substance having primary and secondary coils 70, 72 thereon. Transformer core 68 is interrupted at 71 to define a space or air gap of predetermined size. Transformer 60 is disposed proximate motor shaft 4 so that part 82 of sensor 55 passes through air gap 71 once during each revolution of motor shaft 4.

Primary coil 70 of variable coupling transformer 60 is connected across a suitable source of alternating power. Through transformer action, an alternating signal is induced in secondary coil 72. It is understood that transformer coupling varies with the effective size of transformer air gap 71. Where part 82 of sensor 55 is without air gap 71, the signal induced in secondary coil 72 differs from the signal induced in secondary coil 72 when sensor part 82 is within the air gap 71. The rate of change in the signal induced in secondary transformer coil 72 is dependent upon the rate by which sensor part 82 changes the effective size of air gap 71.

Secondary coil 72 of variable coupling transformer 60 is connected to detector 63, preferably through an amplifier 62. Amplifier 62, preferably a single stage amplifier of any commercially available type, magnifies the alternating signal induced in transformer secondary coil 72. Detector 63 rectifies the alternating signal to provide a unidirectional signal, the intensity of which varies with the effective size of transformer air gap 71. Detector 63 may be any suitable commercially available detector.

Trigger circuits 64, 65 comprise any suitable circuit arrangement for example, a Schmitt trigger circuit, for producing a determined current in response to a predetermined signal trigger circuits 64, 65 are connected between detector 63 and windings 43, 50 of control transformers 40, 48 respectively. Trigger circuits 64, 65, when actuated, pass current through primary windings 43, 50 of control transformers 40, 48 respectively.

A unidirectional current control device, for example, a Zener or breakdown diode 80, is preferably connected across each of the secondary windings 45, 46, 52, 53 respectively of control transformers 40, 42, 48, 49. Resistor 81 may be connected between each of the transformer secondary windings 45, 46, 52, 53 and diode 80. Diodes 80, at a determined voltage, provide a path of current flow to limit the voltage applied to the control electrodes of silicon-controlled rectifiers 22, 24, 30, 32. Additionally, diodes 80 provide a path for current flow following interruption of the circuit to primary windings 43, 44, 50, 51 in a manner to be explained hereinafter. Resistors 81 are suitably sized to regulate current in the control electrode circuit of silicon-controlled rectifiers 22, 24, 30, 32 respectively.

Rotation of motor output shaft 4 is in a clockwise direction as shown by the arrows in FIGURES 1 and 2 of the drawings. As the leading edge 84 of sensor part 82 enters air gap 71 of variable coupling transformer 60, the signal induced in secondary transformer windings 72 changes. The input signal at trigger circuits 64, 65 of pickup device 56 similarly changes.

With sensor 55 in the position shown in FIGURE 2 of the drawings, a first predetermined signal is induced in transformer secondary coil 72. Trigger circuit 64 is actuated to pass a current through primary winding 43 of control transformer 40. The build-up of current in primary winding 43 of transformer 40 results, through transformer action, in a pulse of current through secondary winding 45 of transformer 40 in the control electrode circuit of silicon-controlled rectifier 22. The flow of current in the control electrode circuit of silicon-controlled rectifier 22 places a positive potential on the control electrode thereof to render rectifier 22 operative. Silicon-controlled rectifier 22 completes a circuit from battery 20 through rectifier 22 to common return line 28 to energize winding $W_1$. Current flow in winding $W_1$ is in the direction shown by the solid line arrow in FIGURE 2 of the drawings.

As motor shaft 4 and sensor 55 fixedly secured thereto rotate, the gradually increasing thickness of part 82 of sensor 55 as defined by the slope of forward surface 85 reduces the effective size of transformer air gap 71 with a corresponding change in the signal induced in transformer secondary coil 72. At a predetermined second input signal, trigger circuit 65 of pickup device 56 is actuated to pass a current through primary winding 50 of control transformer 48.

The build-up of current in primary winding 50 induces, by transformer action, a corresponding pulse of current through secondary winding 52 of transformer 48 in the control electrode circuit of silicon-controlled rectifier 30 to place a positive potential on the control electrode of rectifier 30 to render rectifier 30 operative and discharge capacitor 31 through winding $W_1$.

The polarity of capacitor 31 when winding $W_1$ is energized is shown in FIGURE 2 of the drawings. The manner by which capacitor 31 is charged to that polarity will be apparent from the ensuing description. Discharge of capacitor 31 through windings $W_1$ reduces current flow through silicon-controlled rectifier 22 to render rectifier 22 inoperative and interrupt the circuit from battery 20 through rectifier 22 to winding $W_1$.

Capacitor 31, connected across the positive and negative terminals of battery 20 through winding $W_1$ and silicon-controlled rectifier 30, recharges in a polarity opposite that shown in FIGURE 2 of the drawings. As capacitor 31 recharges, the flow of current through silicon-controlled rectifier 30 is reduced and rectifier 30 becomes inoperative, interrupting the circuit between winding $W_1$ and battery 20.

Continued rotation of motor shaft 4 in a clockwise direction brings leading edge 84 of sensor part 82 into the air gap of variable coupling transformer 61 of pickup device 57. As described heretofore, the change in the transformer air gap size due to the movement of sensor part 82 therethrough changes the signal induced in the secondary winding of transformer 61. At a first predetermined signal, trigger circuit 68 of pickup device 57 is actuated to pass a current through primary winding 44 of control transformer 42. The build-up of current in primary winding 44 of control transformer 42 results through transformer action in a pulse of current through the transformer secondary winding 46 in the control electrode circuit of silicon-controlled rectifier 24 to place a positive potential on the control electrode thereof and render rectifier 24 operative. Silicon-controlled rectifier 24 completes a circuit from battery 20 through rectifier 24 to common return line 28 to energize winding $W_1'$. Current flow through winding $W_1'$ is in the direction shown by the solid line arrow in FIGURE 2 of the drawings.

As part 82 of sensor 55 moves through the air gap of transformer 61, a second predetermined signal actuates trigger circuit 69 of pickup device 57 to pass a current through primary winding 51 of control transformer 49. The build-up of current in primary winding 51 induces by transformer action a pulse of current through the secondary winding 53 of transformer 49 in the control electrode circuit of silicon-controlled rectifier 32 to place a positive potential on the control electrode thereof to render rectifier 32 operative and discharge capacitor 31 through winding $W_1$. The resulting flow of current in winding $W_1$ in the direction indicated by the dotted line arrow in FIGURE 2 of the drawings induces, by transformer action, a corresponding flow of current through winding $W_1'$ inductively coupled thereto. Flow of induced current through winding $W_1'$ in the direction indicated by the dotted line arrow in FIGURE 2 of the drawings reduces current flow through silicon-controlled rectifier 24 to render rectifier 24 inoperative to deenergize winding $W_1'$.

Capacitor 31, connected across the positive and negative terminals of control battery 35 through winding $W_1$ by silicon-controlled rectifier 32, recharges in the polarity shown in FIGURE 2 of the drawings. As capacitor 31 recharges the flow of current through silicon-controlled rectifier 32 is reduced and rectifier 32 becomes inoperative, interrupting the circuit between winding $W_1$ and control battery 35.

It is understood that energization of each pair of motor windings $W_n$, $W_n'$ is similarly controlled. Where added pairs of motor windings $W_n$, $W_n'$ are provided, the variable coupling transformers of the respective pickup devices for each added windings are disposed in operative relation with sensor 55 in predetermined angular relationship with each other and coupling transformers 60, 61 of pickup devices 56, 57. It is understood that each pickup device may control energization and deenergization of more than one winding.

In the embodiment illustrated in FIGURE 5 of the drawings, sensor 90 has a generally planar extended part 92 of predetermined arcuate extent having an increasing radial dimension in the direction of motor shaft rotation. Sensor 90 is secured to motor shaft 4 by suitable means (not shown) proximate variable coupling transformers 60, 61 of pickup devices 56, 57 so that extended part 92 of sensor 90 passes through each coupling transformer air gap once during each revolution of motor shaft 4.

With motor shaft 4 rotating in a clockwise direction as shown by the arrow in FIGURE 5 of the drawings, sensor extended part 92, on movement through the variable coupling transformer air gap, reduces the effective size of the transformer air gap. It is understood that the rate at which the size of the variable coupling transformer air gap is reduced by sensor extended part 92 is dependent upon the speed at which the motor shaft rotates and upon the change per degree of arcuate length in the extended part radial dimension. Movement of sensor 90 on rotation of motor shaft 4 through the air gap of coupling transformers 60, 61 changes the output signal induced in the transformer secondary windings to render the silicon-controlled rectifiers 22, 30; 24, 32 operative to selectively energize and deenergize the motor windings $W_1$, $W_1'$ in the manner described heretofore.

It is understood that either the sensor 55, shown in FIGURES 1–4 or the sensor 90 shown in FIGURE 5, may be moved in an opposite or counterclockwise direction. In that instance, extended portion 82 of sensor 55 and extended portion 92 of sensor 90 initially effects the maximum reduction in the coupling transformer air gap, the continued movement of the sensor thereafter decreasing the effective size of the coupling transformer air gap.

While applicants' novel signal producing means is embodied with a specific electronic operating mechanism in a motor having paired inductively coupled energizing windings, it is understood that applicants' signal producing means may be utilized with other types of electronic motor operating arrangements.

While we have described a preferred embodiment of our invention, it is understood that our invention is not limited thereto since it may be otherwise within the scope of the following claims.

We claim:

1. In a motor having at least one energizing winding and a rotor movable in response to energization of the winding with electronic commutating means for energizing said winding, the combination of: signal responsive control means for said electronic commutating means effective at a first signal to cause said electronic commutating means to energize said winding and effective at a second signal to cause said electronic commutating means to deenergize said winding, said signal responsive control means including at least one transformer having a generally C-shaped magnetic core member with input and output coils disposed on opposite legs thereof, said transformer opposite legs defining an air gap of predetermined dimension; a signal source operably connected to said transformer input coil; and means for varying the output signal generated in said transformer output coil in response to movement of said motor rotor including a component having at least one radially extended part of magnetic material adapted to pass through said transformer air gap on each revolution of said motor rotor, said component part having a uniformly changing mass in the direction of motor rotor rotation so that, on first movement of said component part into said air gap, the effective magnetic mass of the portion of said component part within said air gap changes the transformer relationship between said transformer input and output coils to generate said first signal in said transformer output coil whereby said control means causes said electronic commutating means to energize said winding; continued movement of said component part within said transformer air gap changing the transformer relationship between said input and output coils generating said second signal in said output coil whereby said control means causes said electronic commutating means to deenergize said winding.

2. A motor according to claim 1 in which said component part is generally triangular in cross section, the apex of said triangular section forming the leading edge of said component part whereby movement of said component part through said transformer air gap progressively reduces the size of said transformer air gap.

3. A motor according to claim 1 in which said component part has a varying radial dimension.

References Cited by the Examiner

UNITED STATES PATENTS

| | | | |
|---|---|---|---|
| 2,994,023 | 7/1961 | Devol | 318—138 |
| 3,023,348 | 2/1962 | Cox | 318—138 |
| 3,025,443 | 3/1962 | Wilkinson et al. | 318—138 |
| 3,153,185 | 10/1964 | Hummel | 318—138 X |
| 3,200,318 | 9/1965 | Nilson | 318—345 X |
| 3,204,165 | 9/1965 | Kreutzer | 318—138 |

ORIS L. RADER, *Primary Examiner.*

G. SIMMONS, *Assistant Examiner.*